United States Patent
Snyder (10) Patent No.: US 11,147,255 B1
(45) Date of Patent: Oct. 19, 2021

(54) BACKPACK CHAIR ASSEMBLY

(71) Applicant: Jeffery Snyder, San Antonio, TX (US)

(72) Inventor: Jeffery Snyder, San Antonio, TX (US)

( * ) Notice: Subject to any disclaimer, the term of this patent is extended or adjusted under 35 U.S.C. 154(b) by 0 days.

(21) Appl. No.: 17/082,246

(22) Filed: Oct. 28, 2020

(51) Int. Cl.
*A45F 4/02* (2006.01)
*A01K 97/22* (2006.01)
*A01K 97/08* (2006.01)

(52) U.S. Cl.
CPC .............. *A01K 97/22* (2013.01); *A01K 97/08* (2013.01); *A45F 4/02* (2013.01); *A45F 2004/026* (2013.01)

(58) Field of Classification Search
CPC A01K 97/22; A01K 97/08; A45F 4/02; A45F 2004/026; A45F 3/08; A45F 3/047
See application file for complete search history.

(56) References Cited

U.S. PATENT DOCUMENTS

| | | | | |
|---|---|---|---|---|
| 4,286,739 A * | 9/1981 | Silcott | ................... | A45F 4/02 224/153 |
| 4,940,173 A | 7/1990 | Jacober | | |
| D338,779 S | 8/1993 | Albert | | |
| 5,275,316 A | 1/1994 | Kish | | |
| 5,409,291 A | 4/1995 | Lamb | | |
| 5,492,255 A * | 2/1996 | Gansky | ................. | A01M 31/02 224/153 |
| 5,509,279 A | 4/1996 | Brown | | |
| 5,526,537 A * | 6/1996 | Conrad | ................. | A47K 11/04 297/188.12 |
| 5,975,393 A | 11/1999 | Bellamy | | |
| 6,052,939 A | 4/2000 | McClain | | |
| D451,166 S | 11/2001 | Stanbury | | |
| 6,698,830 B1 * | 3/2004 | Gaines | ................. | A47C 15/004 297/183.5 |
| 6,969,112 B1 * | 11/2005 | Sherrill | .................... | A47C 4/20 297/16.1 |
| 6,986,445 B1 * | 1/2006 | Stockman | ................. | A45F 4/02 224/155 |
| 9,185,983 B1 * | 11/2015 | Cohen | ....................... | A47C 4/28 |
| 10,238,214 B1 * | 3/2019 | Haythornthwaite | ...... | A45F 4/02 |
| 2004/0189062 A1 * | 9/2004 | Knight | ..................... | A47C 9/10 297/188.08 |
| 2007/0164063 A1 | 7/2007 | Cpncepeion | | |
| 2007/0205234 A1 * | 9/2007 | Lessmann | ................. | A45F 4/02 224/155 |
| 2008/0078789 A1 * | 4/2008 | Fiola | ........................ | A45F 3/08 224/155 |
| 2008/0302840 A1 * | 12/2008 | Missick | .................... | A45F 4/02 224/155 |

(Continued)

*Primary Examiner* — Brian D Nash (57) ABSTRACT

A backpack chair assembly includes a chair that has a frame portion and a backrest portion that slidably engages the frame portion. The frame portion comprises a plurality of intersecting members such that the frame portion defines a cuboid. A backpack is positioned around the frame portion of the chair having the backpack surrounding the frame portion. The backpack has a plurality of pockets each being integrated into the backpack for storing objects. A pair of shoulder straps is each coupled to the backpack and each of the shoulder straps is wearable over a user's shoulders for carrying the backpack and the chair. A tarp is coupled to the backpack and the tarp is extendable over the backrest portion and the frame portion to inhibit objects stored on the frame portion from falling off.

13 Claims, 8 Drawing Sheets

(56) References Cited

U.S. PATENT DOCUMENTS

| | | | |
|---|---|---|---|
| 2009/0084821 A1* | 4/2009 | Lenzi | A45F 4/02 224/155 |
| 2010/0252589 A1* | 10/2010 | Popescu | A45F 4/02 224/155 |
| 2012/0043358 A1 | 2/2012 | Kelly | |
| 2012/0067930 A1* | 3/2012 | Talavera Tolentino | A45F 4/02 224/155 |
| 2013/0126564 A1* | 5/2013 | Savage, Sr. | A45F 4/02 224/155 |
| 2015/0076182 A1* | 3/2015 | Coleman | A45F 3/04 224/155 |
| 2015/0366357 A1* | 12/2015 | Nelson | A47C 7/506 297/35 |
| 2016/0058192 A1* | 3/2016 | Drew | A47C 7/008 297/4 |
| 2017/0065062 A1* | 3/2017 | Wang | A45F 4/02 |
| 2019/0239627 A1* | 8/2019 | Fant | E04H 15/001 |
| 2019/0374033 A1* | 12/2019 | Grace | A45F 3/14 |
| 2020/0000209 A1* | 1/2020 | Steele | A45F 3/04 |
| 2021/0045535 A1* | 2/2021 | Wilcox | B65D 81/3813 |
| 2021/0093088 A1* | 4/2021 | Downs | A47C 1/14 |

* cited by examiner

BACKPACK CHAIR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to chair devices and more particularly pertains to a new chair device for carrying a variety objects on a user in the convention of a backpack.

(2) Description of Related Art Including Information Disclosed Under 37 CFR 1.97 and 1.98

The prior art relates to chair devices including a chair that has various pockets and a pair of shoulder straps for carrying the chair in the convention of a backpack. Additionally, the prior art discloses a chair that includes fishing rod holders, a tarp and shoulder straps for wearing over a user's shoulders.

BRIEF SUMMARY OF THE INVENTION

An embodiment of the disclosure meets the needs presented above by generally comprising a chair that has a frame portion and a backrest portion that slidably engages the frame portion. The frame portion comprises a plurality of intersecting members such that the frame portion defines a cuboid. A backpack is positioned around the frame portion of the chair having the backpack surrounding the frame portion. The backpack has a plurality of pockets each being integrated into the backpack for storing objects. A pair of shoulder straps is each coupled to the backpack and each of the shoulder straps is wearable over a user's shoulders for carrying the backpack and the chair. A tarp is coupled to the backpack and the tarp is extendable over the backrest portion and the frame portion to inhibit objects stored on the frame portion from falling off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new chair device embodying the principles and concepts of an embodiment of the disclosure and generally designated by the reference numeral 10 will be described.

As best illustrated in FIGS. 1 through 8, the backpack chair assembly 10 generally comprises a chair 12 that has a frame portion 14 and a backrest portion 16 that slidably engages the frame portion 14. The frame portion 14 comprises a plurality of intersecting members 18 such that the frame portion 14 defines a cuboid. The plurality of intersecting members 18 includes a pair of rear uprights 20 and a lower cross member 22 interesting each of the rear uprights 20. The frame portion 14 has a pair of openings 24 each being oriented at an intersection between respective ones of the rear uprights 20 and the lower cross member 22, and each of the openings 24 extends into an interior of the lower cross member 22.

Each of the rear uprights 20 extends upwardly beyond an upper threshold 26 of the frame portion 14. Additionally, each of the rear uprights 20 has an upper end 28 that is open into an interior of the rear uprights 20. The backrest portion 16 includes a first member 30 extending between a pair of second members 32, and each of the second members 32 is oriented perpendicular to the first member 30. Each of the second members 32 slidably extends into the upper end 28 of a respective one of the rear uprights 20 thereby facilitating the first member 30 to be spaced a selected distance upwardly from the rear uprights 20. Additionally, the first member 30 has a first end 36 and a second end 38, and each of the first end 36 and the second end 38 is open.

A pair of mesh screens 40 is provided and each of the mesh screens 40 is coupled to the frame portion 14. Each of the mesh screens 40 is positioned on a respective one of the upper threshold 26 and a lower threshold 42 of the frame portion 14 to inhibit the frame portion 14 from sinking into a support surface 44 when the chair 12 is positioned on the support surface 44 and a user 46 is sitting on the chair 12. A pair of first rod holders 48 is provided and each of the first rod holders 48 is slidably positionable in the frame portion 14 of the chair 12 to receive a handle of a respective fishing rod 50. Each of the first rod holders 48 includes a tube 52 and a pair of cylinders 54 that is each coupled to the tube 52 having the cylinders 54 being oriented perpendicular to the tube 52. The tube 52 of each of the first rod holders 48 is insertable into a respective one of the openings 24 in the frame portion 14 of the chair 12 having each of the cylinders 54 being vertically oriented.

A pair of second rod holders 56 is provided and each of the second rod holders 56 is slidably positionable in the backrest portion 16 of the chair 12 having each of the second rod holders 56 is aligned with a respective one of the first rod holders 48. In this way each of the second rod holders 56 retains the respective fishing rod 50 in an upright orientation. Each of the second rod holders 56 includes a pipe 58 and a pair of collars 60 each being coupled to the pipe 58. The pipe 58 of each of the second rod holders 56 is insertable into a respective one of the first end 36 and the second end 38 of the first member 30 of the backrest portion 16 of the chair 12. Additionally, each of the collars 60 associated with each of the second rod holders 56 is aligned with a respective one of the cylinders 54 associated with a respective one of the first rod holders 48 when each of the first rod holders 48 and each of the second rod holders 56 are engaged to the chair 12.

Figure 1:
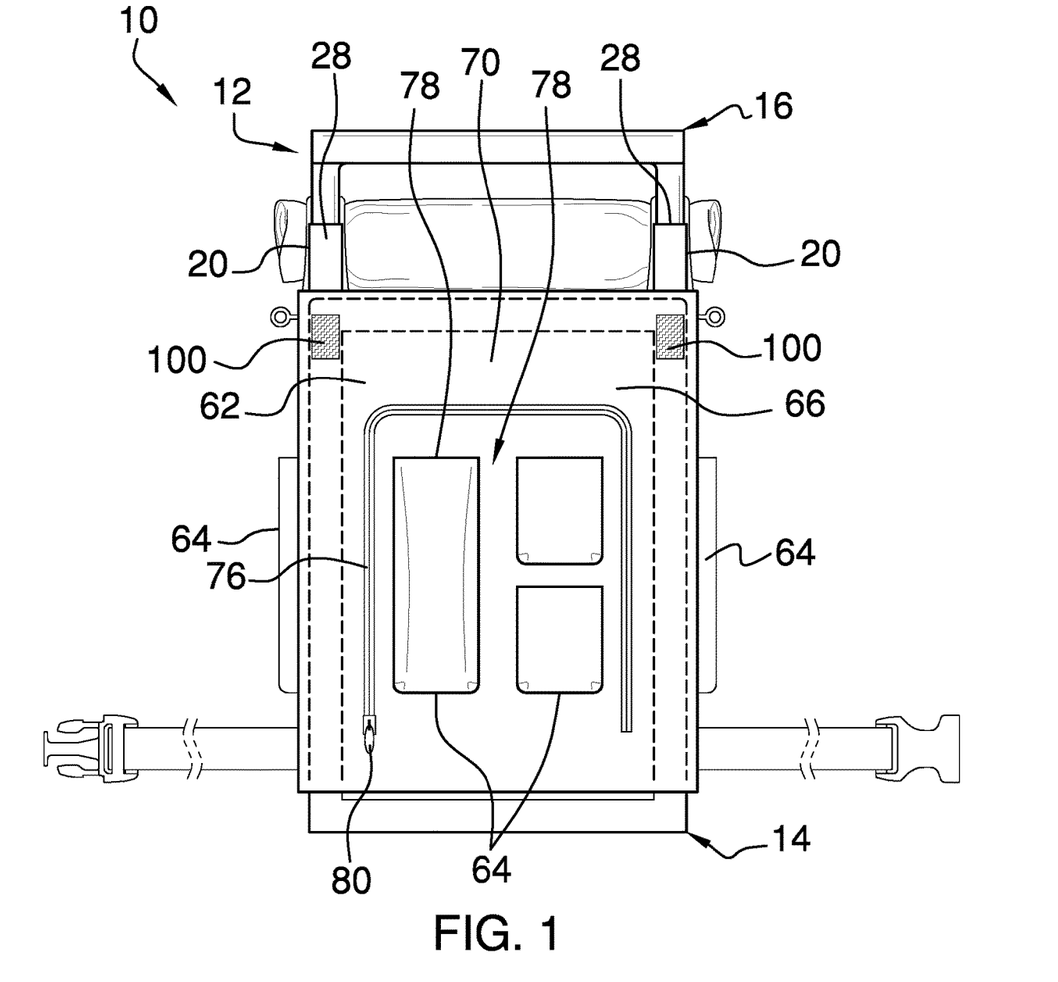
FIG. 1 is a back view of a backpack chair assembly according to an embodiment of the disclosure.
Figure 2:
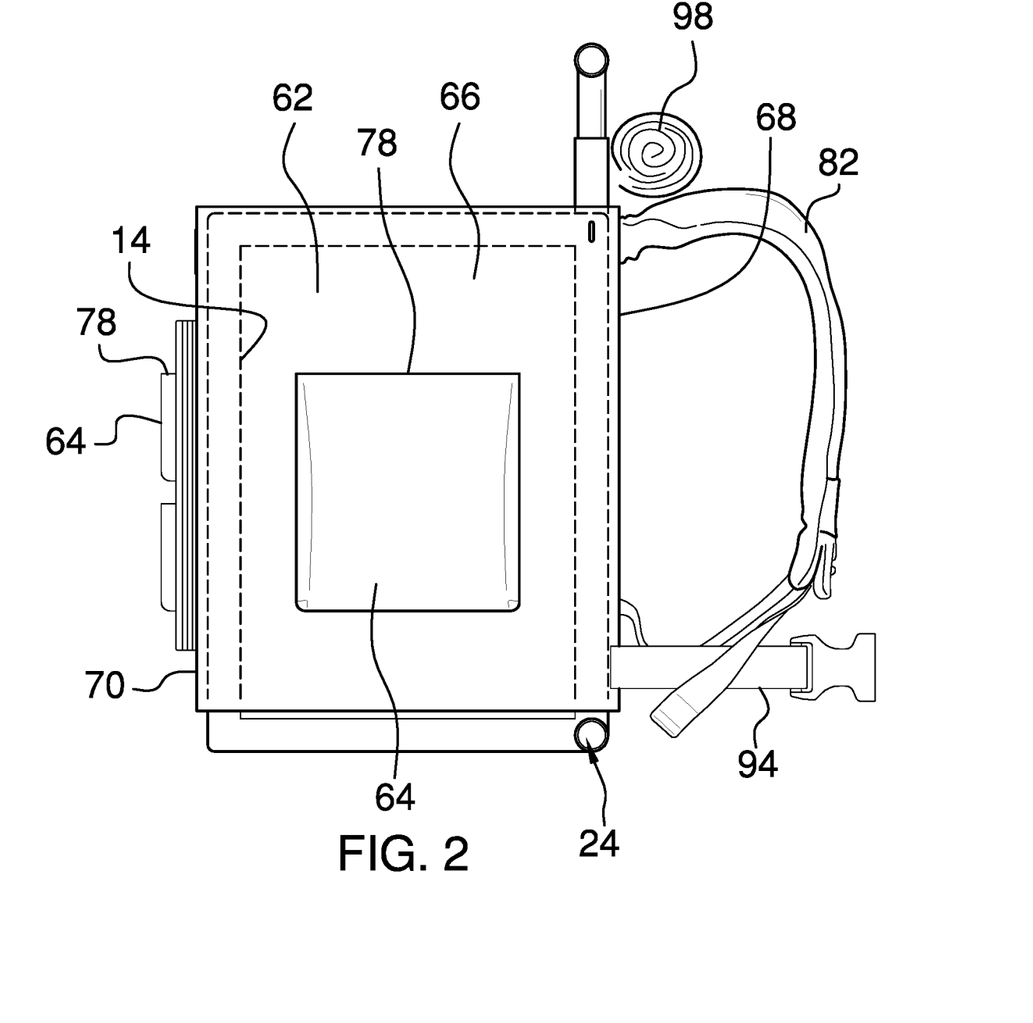
FIG. 2 is a right side view of an embodiment of the disclosure.
Figure 3:
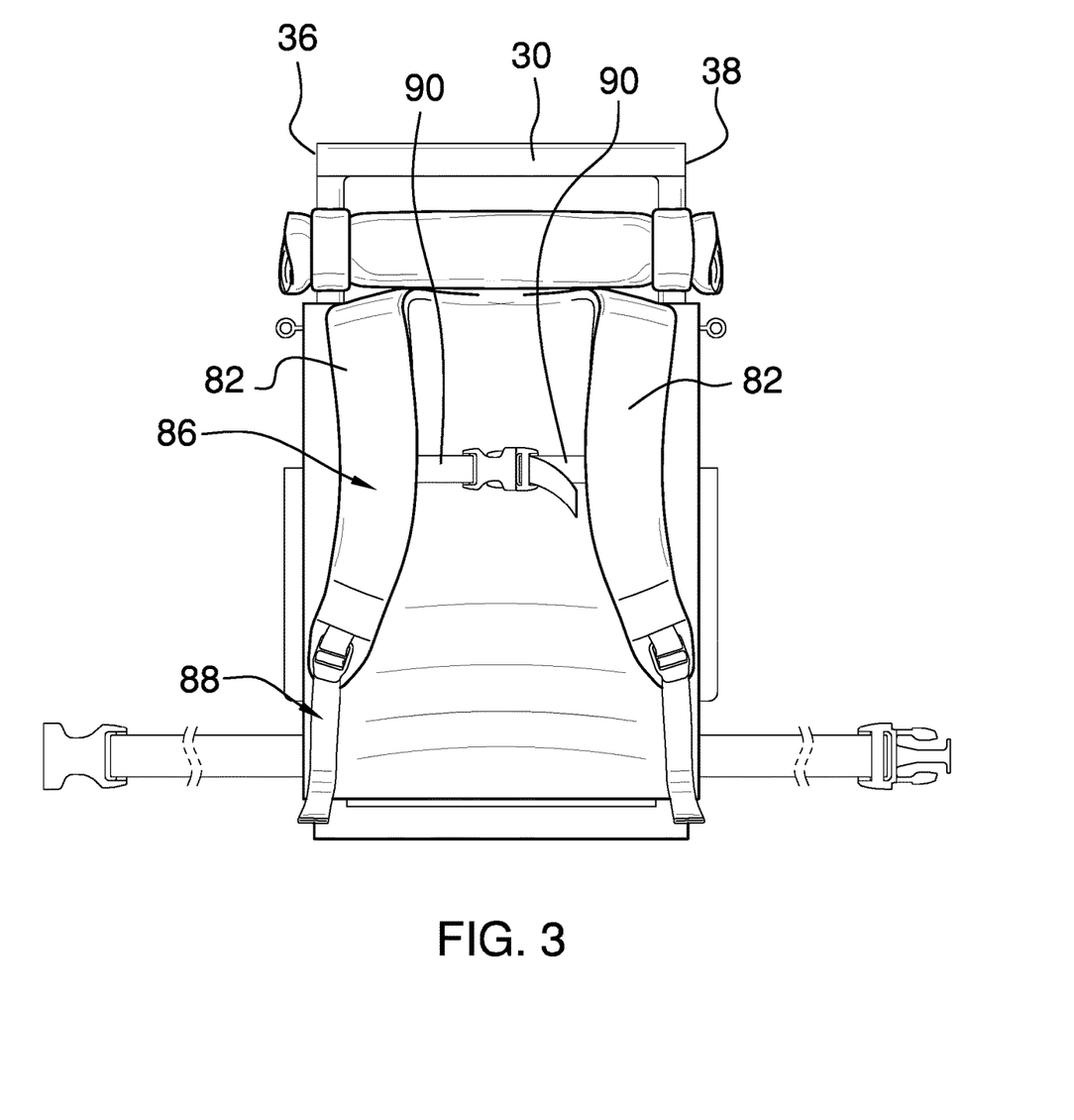
FIG. 3 is a front view of an embodiment of the disclosure.
Figure 4:
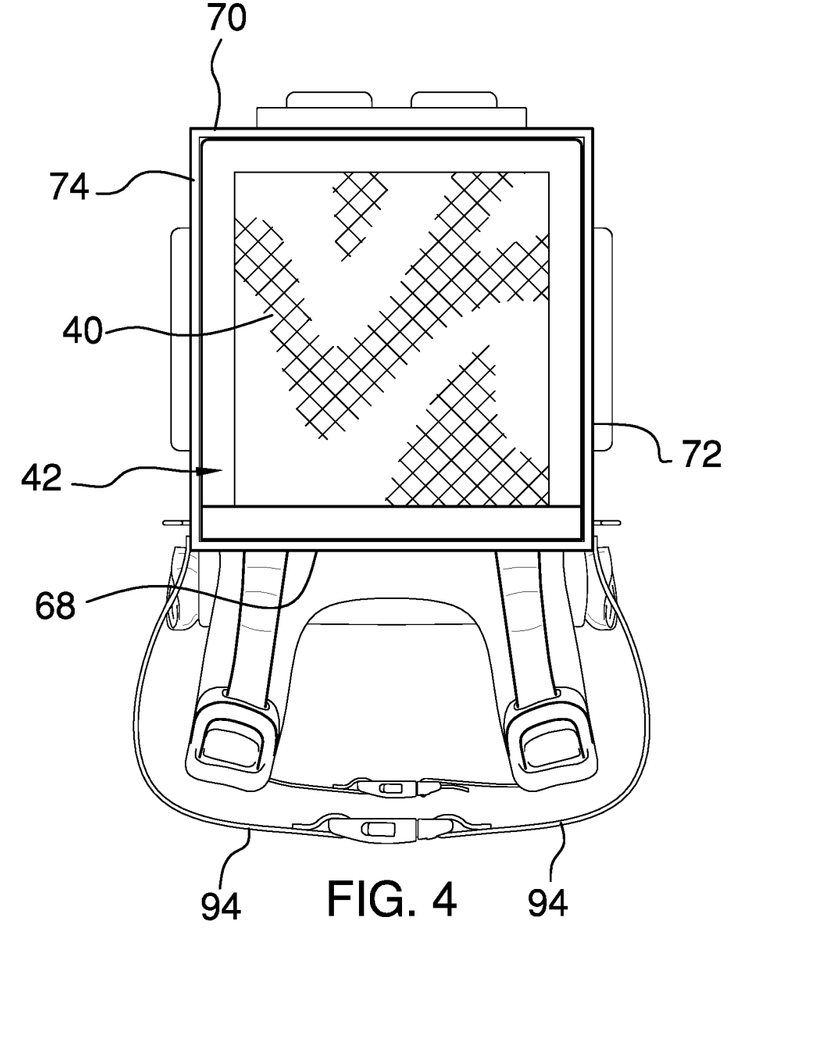
FIG. 4 is a bottom view of an embodiment of the disclosure.
Figure 5:
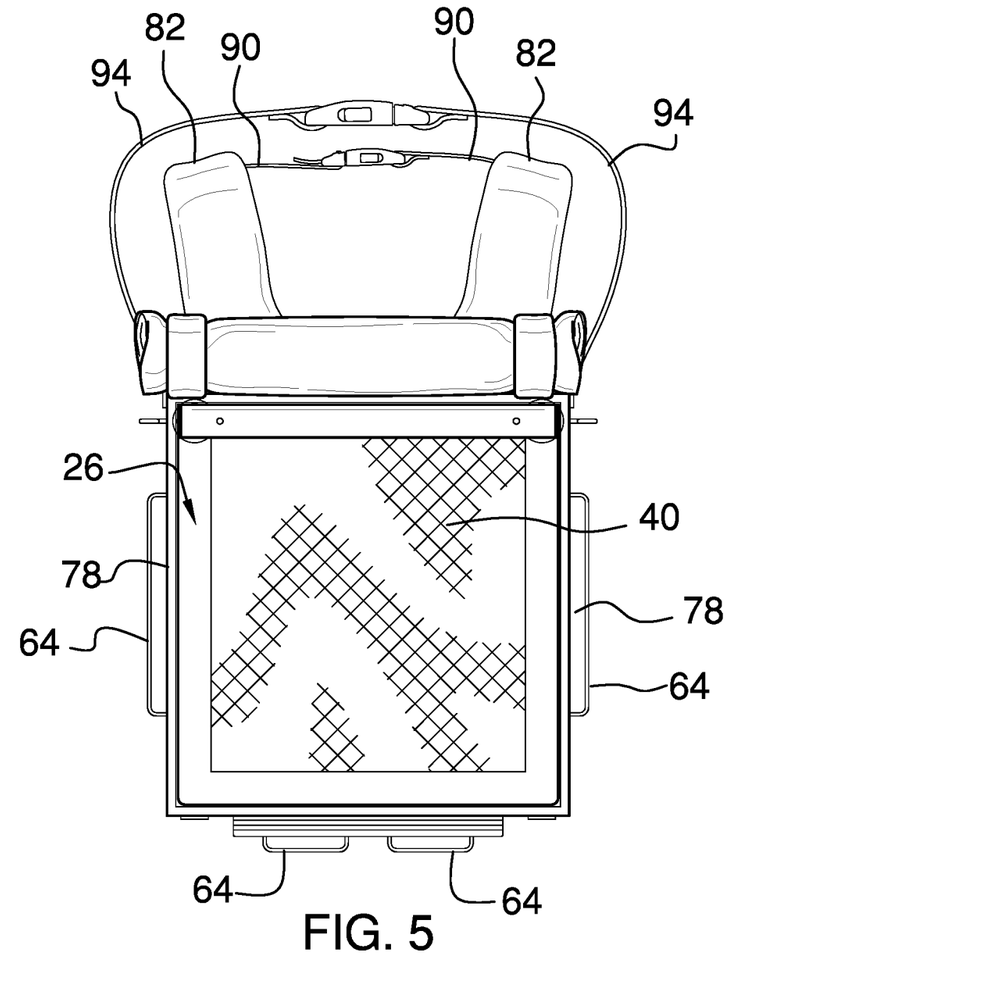
FIG. 5 is a top view of an embodiment of the disclosure.
Figure 6:
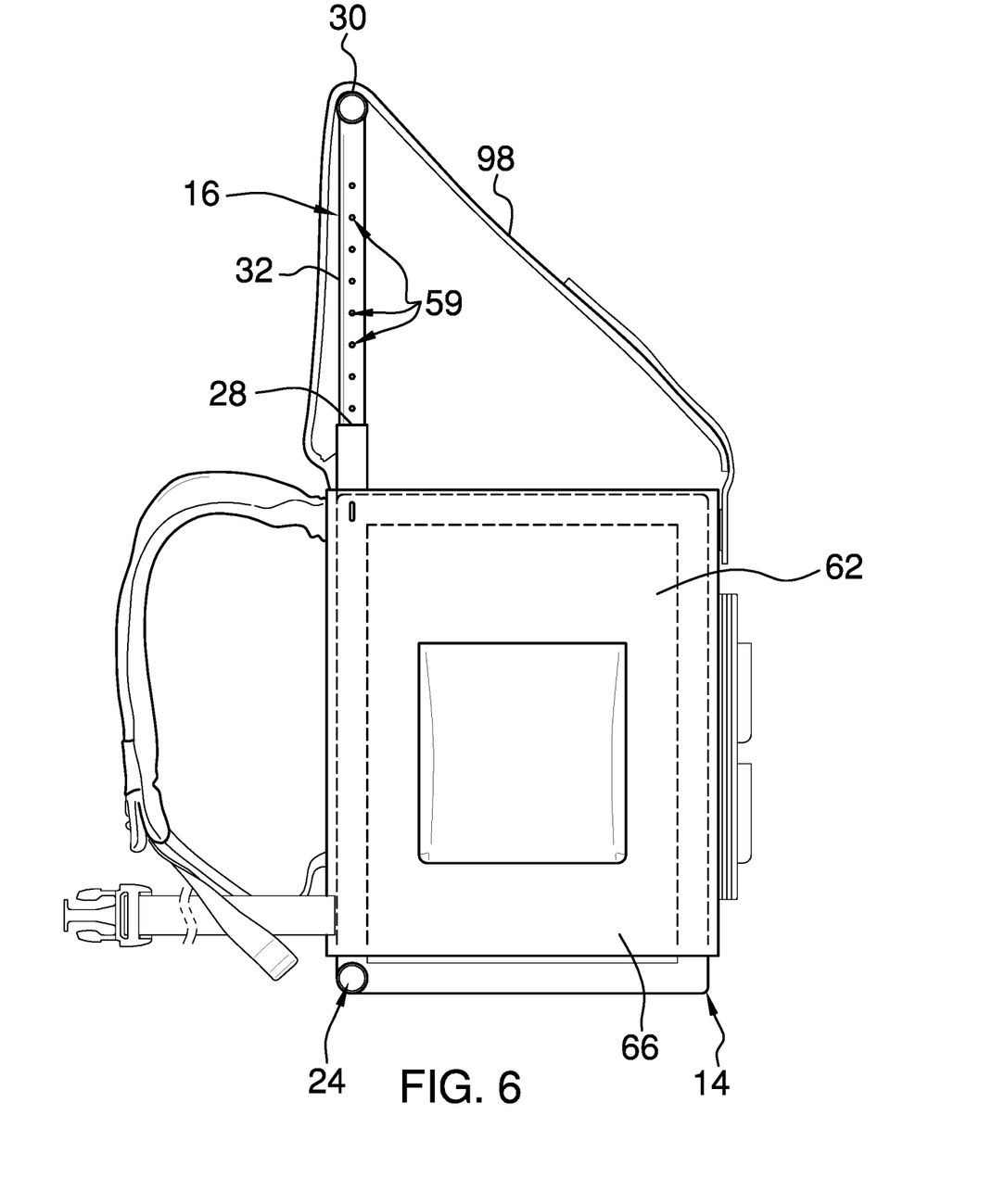
FIG. 6 is a left side view of an embodiment of the disclosure.
Figure 7:
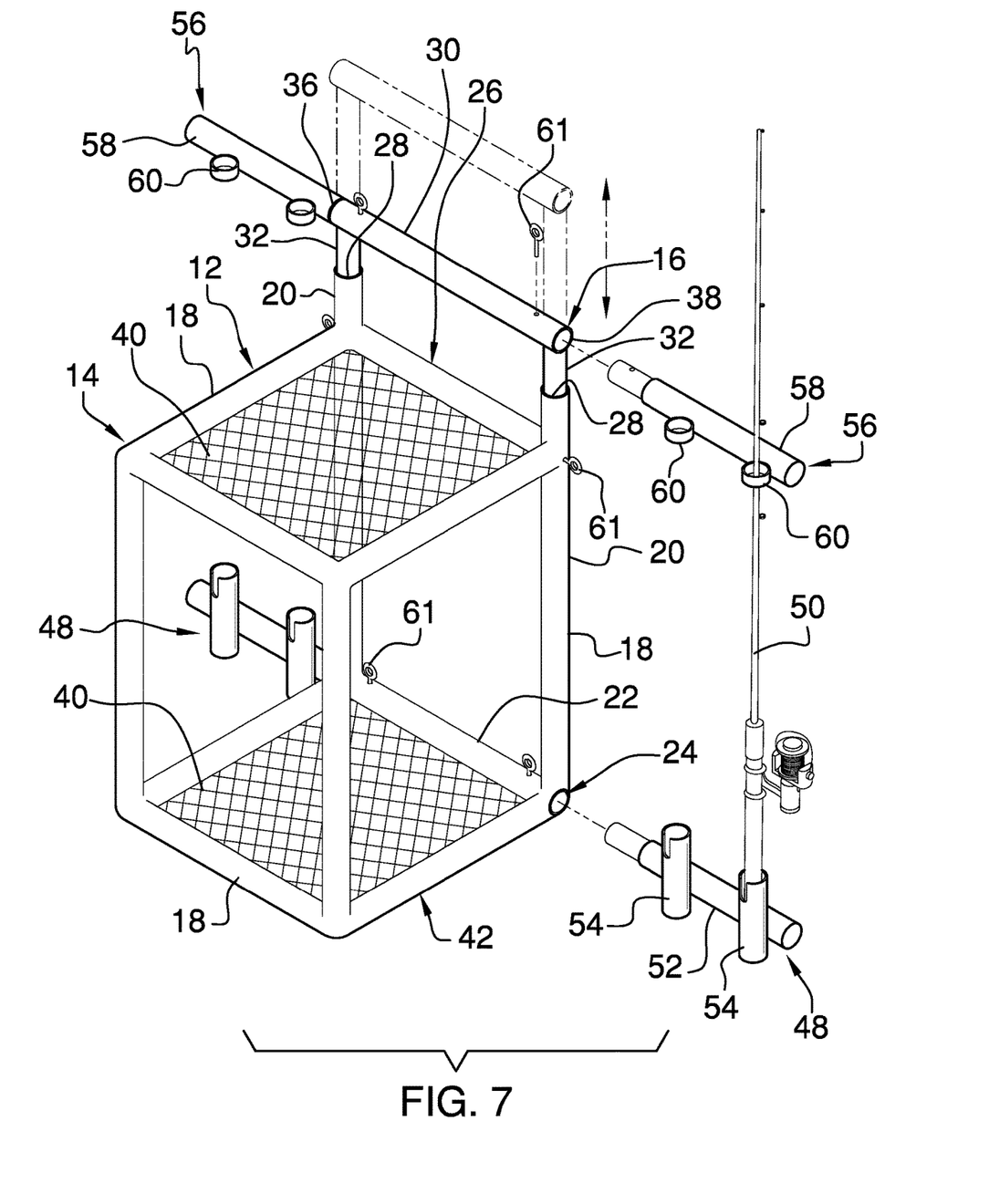
FIG. 7 is a perspective view of a chair of an embodiment of the disclosure.
Figure 8:
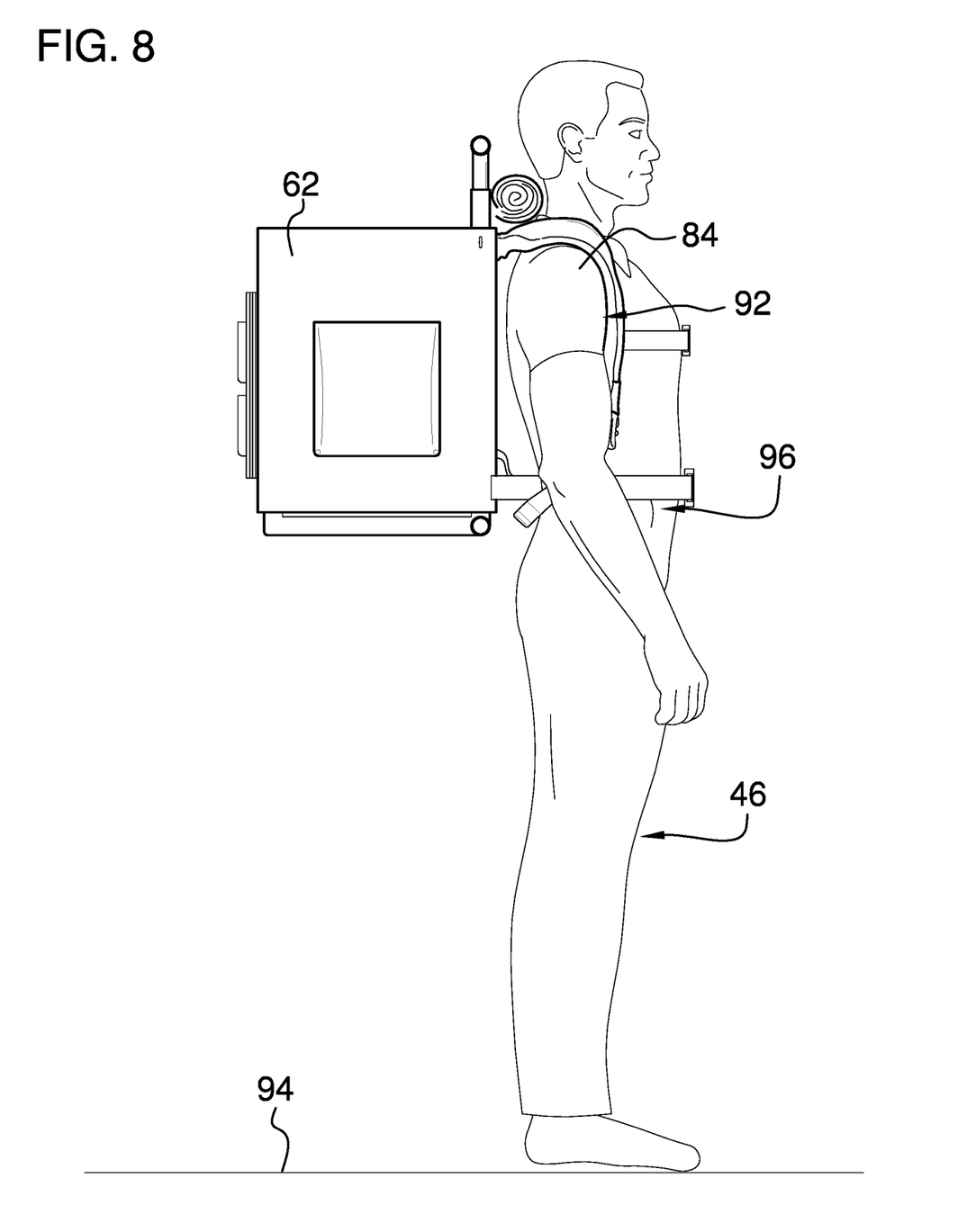
FIG. 8 is a perspective in-use view of an embodiment of the disclosure.

As is most clearly shown in FIG. 6, each of the second members 32 of the backrest portion 16 has a plurality of holes 59 extending therethrough. A plurality of bolts 61 is provided and each of the bolts 61 is extendable through respective ones of the first member 30 of the backrest portion 16, respective rear uprights 20 and the lower cross member 22. Additionally, each of the bolts 61 engages respective ones of the holes 59 in a respective second member 32, respective ones of the first rod holders 48 and respective ones of the second rod holders 56.

A backpack 62 is positioned around the frame portion 14 of the chair 12 having the backpack 62 surrounding the frame portion 14. The backpack 62 has a plurality of pockets 64 each being integrated into the backpack 62 for storing objects. The backpack 62 has an outer wall 66 and the outer wall 66 has a front side 68, a back side 70, a first lateral side 72 and a second lateral side 74. Additionally, each of the mesh screens 40 is exposed when the backpack 62 is positioned around the frame portion 14.

Each of the pockets 64 is positioned on the outer wall 66 and the plurality of pockets 64 is positioned on a respective one of the first lateral side 72, the second lateral side 74 and the back side 70. The back side 70 has a cut 76 extending therethrough to define a flap 78 on the back side 70 to facilitate objects to be positioned inside of the frame portion 14 of the chair 12 for storage. Moreover, the cut 76 extends around each of the pockets 64 that are positioned on the back side 70. Each of the pockets 64 has an upper end 78 and the upper end 78 of each of the pockets 64 is open to receive the objects for storage. A fastener 80 is coupled to the back side 70 of the outer wall 66 of the backpack 62, the fastener 80 is coextensive with the cut 76 and the fastener 80 opens and closes the cut 76. The fastener 80 may comprise a zipper or other type of releasable, mechanical fastener.

A pair of shoulder straps 82 is provided and each of the shoulder straps 82 is coupled to the backpack 62 for wearing over a user's shoulders 84 to carry the backpack 62 and the chair 12. Each of the shoulder straps 82 is positioned on the front side 68 of the outer wall 66 of the backpack 62. Each of the shoulder straps 82 includes a first portion 86 that slidably engages a second portion 88 such that each of the shoulder straps 82 has an adjustable length to accommodate differing sizes of users. Each of the shoulder straps 82 may include cushions for enhancing comfort for the user and a pair of adjustment buckles for adjusting the length of each shoulder strap.

A pair of chest straps 90 is provided and each of the chest straps 90 is coupled to a respective one of the shoulder straps 82. Thus, each of the chest straps 90 can extend across a user's chest 92 when the shoulder straps 82 are worn on the user's shoulders 84. Each of the chest straps 90 is matable to each other and each of the chest straps 90 may include complementary buckles that releasably engage each other. A pair of waist straps 94 is each coupled to the backpack 62 and each of the waist straps 94 can be extended around the user's waist 96 when the shoulder straps 82 are worn over the user's shoulders 84. Each of the waist straps 94 is positioned on the front side 68 of the outer wall 66 of the backpack 62 and each of the waist straps 94 is matable to each other. The pair of waist straps 94 may include complementary buckles that releasably engage each other.

A tarp 98 is coupled to the backpack 62 and the tarp 98 is extendable over the backrest portion 16 and the frame portion 14 to inhibit objects on the frame portion 14 from falling off. In this way objects can be placed on the mesh screen 40 that is positioned on the upper threshold 26 of the frame portion 14 for storage. The tarp 98 is attached to the front side 68 of the outer wall 66 of the backpack 62 and the tarp 98 can be extended over the frame portion 14 to engage the back side 70 of the outer wall 66 of the backpack 62. A pair of mating members 100 is each coupled to the back side 70 of the outer wall 66 of the backpack 62 and each of the mating members 100 releasably engages the tarp 98 when the tarp 98 is extended over the frame portion 14.

In use, the backpack 62 is worn to transport all of the objects that are stored in the pockets 64 and the objects that are positioned within the backpack 62. The backpack 62 can be stood on the ground and each of the first rod holders 48 and the second rod holders 56 can be engaged to the frame portion 14 for holding the fishing rods 50. Additionally, the backrest portion 16 can be extended to facilitate the user 46 to sit on the chair 12. In this way the backpack 62 facilitates all of the equipment for fishing, or any other activity, to be carried in a hands free manner by the user 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A backpack chair assembly for carrying fishing equipment on a user's back and facilitating the user to sit down at a fishing site, said assembly comprising:
   a chair having a frame portion and a backrest portion slidably engaging said frame portion, said frame portion comprising a plurality of intersecting members such that said frame portion defines a cuboid;
   a pair of first rod holders, each of said first rod holders being slidably positionable in said frame portion of said chair wherein each of said first rod holders is configured to receive a handle of a respective fishing rod;
   a pair of second rod holders, each of said second rod holders being slidably positionable in said backrest portion of said chair having each of said second rod holders being aligned with a respective one of said first rod holders wherein each of said second rod holders is configured to retain the respective fishing rods in an upright orientation;
   a backpack being positioned around said frame portion of said chair having said backpack surrounding said frame portion, said backpack having a plurality of pockets each being integrated into said backpack wherein each of said pockets is configured to store objects;
   a pair of shoulder straps, each of said shoulder straps being coupled to said backpack wherein each of said shoulder straps is configured to be worn over a user's shoulders for carrying said backpack and said chair;
   a pair of chest straps, each of said chest straps being coupled to a respective one of said shoulder straps wherein each of said chest straps is configured to extend across a user's chest when said shoulder straps are worn on the user's shoulders, each of said chest straps being matable to each other,
   a pair of waist straps, each of said waist straps being coupled to said backpack wherein each of said waist straps is configured to be extended around the user's waist when said shoulder straps are worn over the user's shoulders, each of said waist straps being positioned on said front side of said outer wall of said backpack, each of said waist straps being matable to each other;
   a tarp being coupled to said backpack, said tarp being extendable over said backrest portion and said frame portion wherein said tarp is configured to inhibit objects on said frame portion from falling off.

2. The assembly according to claim 1, wherein said plurality of intersecting members includes a pair of rear uprights and a lower cross member interesting each of said rear uprights, said frame portion having a pair of openings each being oriented at an intersection between respective ones of said rear uprights and said lower cross member, each of said openings extending into an interior of said lower cross member, each of said rear uprights extending upwardly beyond an upper threshold of said frame portion, each of said rear uprights having an upper end being open into an interior of said rear uprights.

3. The assembly according to claim 2, wherein said backrest portion includes a first member extending between a pair of second members, each of said second members being oriented perpendicular to said first member, each of said second members slidably extending into said upper end of a respective one of said rear uprights thereby facilitating said first member to be spaced a selected distance upwardly from said rear uprights, said first member having a first end and a second end, each of said first end and said second end being open.

4. The assembly according to claim 3, wherein:
   each of said first rod holders includes a pair of cylinders; and
   each of said second rod holders includes a pipe and a pair of collars each being coupled to said pipe, said pipe of each of said second rod holders being insertable into a respective one of said first end and said second end of said first member of said backrest portion of said chair, each of said collars associated with each of said second rod holders being aligned with a respective one of said cylinders associated with a respective one of said first rod holders when each of said first rod holders and each of said second rod holders is engaged to said chair.

5. The assembly according to claim 2, further comprising a pair of mesh screens, each of said mesh screens being coupled to said frame portion, each of said mesh screens being positioned on a respective one of said upper threshold and a lower threshold of said frame portion wherein said mesh screen on said lower threshold is configured to inhibit said frame portion from sinking into a support surface when said chair is positioned on the support surface and a user is sitting on said chair.

6. The assembly according to claim 5, wherein said backpack has an outer wall, said outer wall having a front side, a back side, a first lateral side and a second lateral side, each of said mesh screens being exposed when said backpack is positioned around said frame portion, each of said pockets being positioned on said outer wall, said plurality of pockets being positioned on a respective one of said first lateral side, said second lateral side and said back side.

7. The assembly according to claim 6, wherein said back side has a cut extending therethrough to define a flap on said back side wherein said flap is configured to facilitate objects to be positioned inside of said frame portion of said chair for storage, said cut extending around each of said pockets being positioned on said back side, each of said pockets having an upper end, said upper end of each of said pockets being open wherein said upper end of each of said pockets is configured to receive the objects for storage.

8. The assembly according to claim 7, further comprising a fastener being coupled to said back side of said outer wall of said backpack, said fastener being coextensive with said cut, said fastener opening and closing said cut.

9. The assembly according to claim 6, wherein each of said shoulder straps is positioned on said front side of said outer wall of said backpack, each of said shoulder straps including a first portion slidably engaging a second portion such that each of said shoulder straps has an adjustable length wherein each of said shoulder straps is configured to accommodate differing sizes of users.

10. The assembly according to claim 6, wherein said tarp is attached to said front side of said outer wall of said backpack.

11. The assembly according to claim 6, further comprising a pair of mating members, each of said mating members being coupled to said back side of said outer wall of said backpack, each of said mating members releasably engaging said tarp when said tarp is extended over said frame portion.

12. The assembly according to claim 2, wherein each of said first rod holders includes a tube and a pair of cylinders each being coupled to said tube having said cylinders being oriented perpendicular to said tube, said tube of each of said first rod holders being insertable into a respective one of said openings in said frame portion of said chair having each of said cylinders being vertically oriented.

13. A backpack chair assembly for carrying fishing equipment on a user's back and facilitating the user to sit down at a fishing site, said assembly comprising:

a chair having a frame portion and a backrest portion slidably engaging said frame portion, said frame portion comprising a plurality of intersecting members such that said frame portion defines a cuboid, said plurality of intersecting members including a pair of rear uprights and a lower cross member interesting each of said rear uprights, said frame portion having a pair of openings each being oriented at an intersection between respective ones of said rear uprights and said lower cross member, each of said openings extending into an interior of said lower cross member, each of said rear uprights extending upwardly beyond an upper threshold of said frame portion, each of said rear uprights having an upper end being open into an interior of said rear uprights, said backrest portion including a first member extending between a pair of second members, each of said second members being oriented perpendicular to said first member, each of said second members slidably extending into said upper end of a respective one of said rear uprights thereby facilitating said first member to be spaced a selected distance upwardly from said rear uprights, said first member having a first end and a second end, each of said first end and said second end being open;

a pair of mesh screens, each of said mesh screens being coupled to said frame portion, each of said mesh screens being positioned on a respective one of said upper threshold and a lower threshold of said frame portion wherein said mesh screen on said lower threshold is configured to inhibit said frame portion from sinking into a support surface when said chair is positioned on the support surface and a user is sitting on said chair;

a pair of first rod holders, each of said first rod holders being slidably positionable in said frame portion of said chair wherein each of said first rod holders is configured to receive a handle of a respective fishing rod, each of said first rod holders including a tube and a pair of cylinders each being coupled to said tube having said cylinders being oriented perpendicular to said tube, said tube of each of said first rod holders being insertable into a respective one of said openings in said frame portion of said chair having each of said cylinders being vertically oriented;

a pair of second rod holders, each of said second rod holders being slidably positionable in said backrest portion of said chair having each of said second rod holders being aligned with a respective one of said first rod holders wherein each of said second rod holders is configured to retain the respective fishing rods in an upright orientation, each of said second rod holders including a pipe and a pair of collars each being coupled to said pipe, said pipe of each of said second rod holders being insertable into a respective one of said first end and said second end of said first member of said backrest portion of said chair, each of said collars associated with each of said second rod holders being aligned with a respective one of said cylinders associated with a respective one of said first rod holders when each of said first rod holders and each of said second rod holders is engaged to said chair;

a backpack being positioned around said frame portion of said chair having said backpack surrounding said frame portion, said backpack having a plurality of pockets each being integrated into said backpack wherein each of said pockets is configured to store objects, said backpack having an outer wall, said outer wall having a front side, a back side, a first lateral side and a second lateral side, each of said mesh screens being exposed when said backpack is positioned around said frame portion, each of said pockets being positioned on said outer wall, said plurality of pockets being positioned on a respective one of said first lateral side, said second lateral side and said back side, said back side having a cut extending therethrough to define a flap on said back side wherein said flap is configured to facilitate objects to be positioned inside of said frame portion of said chair for storage, said cut extending around each of said pockets being positioned on said back side, each of said pockets having an upper end, said upper end of each of said pockets being open wherein said upper end of each of said pockets is configured to receive the objects for storage;

a fastener being coupled to said back side of said outer wall of said backpack, said fastener being coextensive with said cut, said fastener opening and closing said cut;

a pair of shoulder straps, each of said shoulder straps being coupled to said backpack wherein each of said shoulder straps is configured to be worn over a user's shoulders for carrying said backpack and said chair, each of said shoulder straps being positioned on said front side of said outer wall of said backpack, each of said shoulder straps including a first portion slidably engaging a second portion such that each of said shoulder straps has an adjustable length wherein each of said shoulder straps is configured to accommodate differing sizes of users;

a pair of chest straps, each of said chest straps being coupled to a respective one of said shoulder straps wherein each of said chest straps is configured to extend across a user's chest when said shoulder straps are worn on the user's shoulders, each of said chest straps being matable to each other;

a pair of waist straps, each of said waist straps being coupled to said backpack wherein each of said waist straps is configured to be extended around the user's waist when said shoulder straps are worn over the user's shoulders, each of said waist straps being positioned on said front side of said outer wall of said backpack, each of said waist straps being matable to each other;

a tarp being coupled to said backpack, said tarp being extendable over said backrest portion and said frame portion wherein said tarp is configured to inhibit objects on said frame portion from falling off, said tarp being attached to said front side of said outer wall of said backpack; and a pair of mating members, each of said mating members being coupled to said back side of said outer wall of said backpack, each of said mating members releasably engaging said tarp when said tarp is extended over said frame portion.

* * * * *